US012311610B2

(12) United States Patent
Augenstein et al.

(10) Patent No.: US 12,311,610 B2
(45) Date of Patent: May 27, 2025

(54) METHOD FOR OPERATING AN ULTRASONIC WELDING MACHINE

(71) Applicant: Herrmann Ultraschalltechnik Gmbh & Co. KG, Karlsbad (DE)

(72) Inventors: Micha Augenstein, Malsch (DE); Sven Roessler, Malsch (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 26 days.

(21) Appl. No.: 18/252,883

(22) PCT Filed: Nov. 16, 2021

(86) PCT No.: PCT/EP2021/081792
§ 371 (c)(1),
(2) Date: May 15, 2023

(87) PCT Pub. No.: WO2022/106392
PCT Pub. Date: May 27, 2022

(65) Prior Publication Data
US 2023/0415423 A1 Dec. 28, 2023

(30) Foreign Application Priority Data
Nov. 17, 2020 (DE) ...................... 10 2020 130 325.4

(51) Int. Cl.
B32B 41/00 (2006.01)
B23K 20/10 (2006.01)
B29C 65/08 (2006.01)
(52) U.S. Cl.
CPC ............ B29C 65/086 (2013.01); B23K 20/10 (2013.01)

(58) Field of Classification Search
CPC ................ B29C 65/086; B29C 66/872; B29C 66/92431; B29C 66/92441;
(Continued)

(56) References Cited

U.S. PATENT DOCUMENTS 6,458,228 B1    10/2002   Yoshimoto
8,172,969 B2    5/2012    Lee et al.
(Continued)

FOREIGN PATENT DOCUMENTS

DE    4206584 A1 *  9/1993  ............. B23K 20/10
EP    2522492 A2    11/2012
(Continued)

OTHER PUBLICATIONS

Agnes Wittmann-Regis, The International Bureau of the World Intellectual Property Organization, International Preliminary Report on Patentability, Report Dated: May 16, 2023, PCT/EP2021/081792 (English translation).

(Continued)

Primary Examiner — Michael N Orlando
Assistant Examiner — Joshel Rivera
(74) Attorney, Agent, or Firm — PAUL & PAUL

(57) ABSTRACT

The invention relates to a method for operating an ultrasonic welding machine. During a welding process, a flat material is continuously moved through a gap formed between a sonotrode (1), which is vibrated at an ultrasonic frequency with a welding amplitude, and an anvil (2) at a welding speed while a welding force is exerted onto the flat material by the anvil (2) and/or the sonotrode (1). The invention is (Continued)

Figure 1:
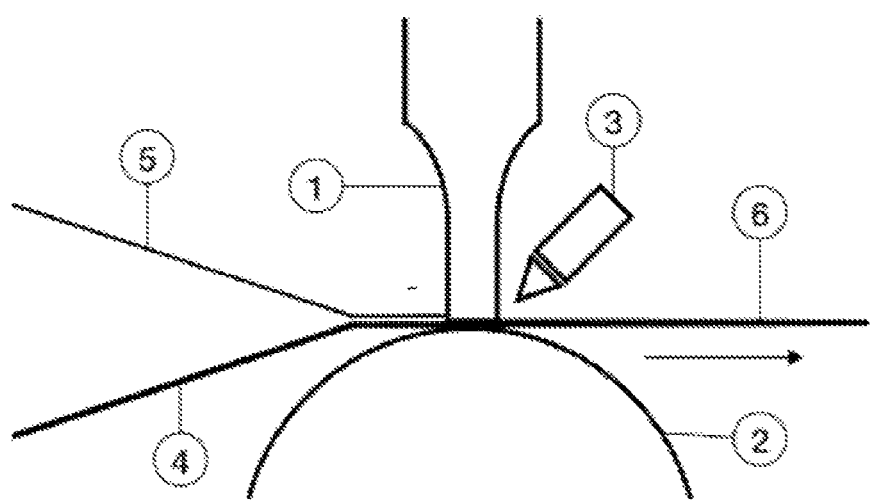

characterised in that during a welding phase, the ACTUAL temperature of the flat material is measured after the flat material has passed through the gap, the ACTUAL temperature is compared with a predetermined TARGET temperature, and the welding amplitude is varied on the basis of the comparison result.

6 Claims, 2 Drawing Sheets

(58) Field of Classification Search
CPC ........ B29C 66/93431; B29C 66/93441; B29C 66/1122; B29C 66/45; B29C 66/73921; B29C 66/83411; B29C 66/91221; B29C 66/92445; B29C 66/92921; B29C 66/9392; B29C 66/9516; B29C 66/9592; B29C 66/961; B23K 20/10
USPC .................... 156/60, 64, 350, 351, 378, 379
See application file for complete search history.

(56) References Cited

U.S. PATENT DOCUMENTS

| | | | |
|---|---|---|---|
| 8,557,071 | B2 | 10/2013 | Weiler |
| 2018/0153211 | A1* | 6/2018 | Persson ............. B29C 66/73921 |

FOREIGN PATENT DOCUMENTS

| | | | |
|---|---|---|---|
| EP | 2424724 | B1 | 8/2019 |
| JP | 63315223 | A | 12/1988 |
| JP | S63315223 | A | 12/1988 |
| JP | 2012236622 | A | 12/2012 |
| WO | 2006042251 | A2 | 4/2006 |
| WO | 2010125030 | A1 | 11/2010 |

OTHER PUBLICATIONS

Japanese Patent Application No. 2023-529064, Office Action Dated Feb. 25, 2025, Patent Office Examiner Iwami Tsutomu, 2nd Examination Dept., Production Machinery (Processing Machine) Division.

* cited by examiner

METHOD FOR OPERATING AN ULTRASONIC WELDING MACHINE

CROSS-REFERENCE TO RELATED APPLICATIONS

This application is a national phase application of International Application PCT/EP2021/081792, filed Nov. 16, 2021, which claims the priority of German Patent Application 10 2020 130 325.4, filed Nov. 11, 2020, both of which are incorporated herein in their entireties by reference.

The invention relates to a method for operating an ultrasonic welding machine, in which, during a welding process, a flat material is continuously moved through a gap formed between a sonotrode and an anvil at a welding speed. The sonotrode is vibrated at an ultrasonic frequency with a welding amplitude. When moving the flat material, which can consist of multiple films to be welded together, for example, a welding force is exerted on the flat material by the anvil and/or by the sonotrode. Often, a force is exerted on the stationary anvil by means of the sonotrode via the material to be welded. However, it is also possible that a force is exerted on the flat material with the anvil.

Especially when welding films, which in turn consist of different layers, it is often desired that only the film layers facing each other are melted by ultrasonic input during the welding operation, while the other film layers are not melted. This can be achieved by selecting the melting points of the individual layers of a foil.

However, monomaterials are increasingly being used, in which the individual layers are made from the same material but have been treated differently physically. For example, one layer can be stretched monoaxially or biaxially, while another layer is not. However, the different layers then have very similar melting temperatures, because they are made from the same material, so that when welding such films, the process window, i.e. the temperature range that can and must be achieved between the films to be welded during ultrasonic processing, is very narrow.

This is often a problem when starting the ultrasonic welding machine, because it slowly warms up during operation. In addition, there can also be fluctuations in the welding speed, fluctuations in the material thickness, and other changes in the system that can cause the process window to be left, and the welding of the flat material is either too great so that other layers are affected or too little so that the welding will detach in later use and the welded joint will not be tight.

In addition, it can be necessary to intentionally change the welding speed. At a higher welding speed, under otherwise constant conditions, a lower temperature is achieved at the film layers to be joined than at a lower welding speed. With every change to the process, therefore, ideal process parameters must be found again in order to ensure a reliable welding. With a narrow process window, this can only be achieved by very experienced personnel. In addition, this can be very time consuming.

The problem addressed by the present invention is therefore to specify a method by which an ultrasonic welding machine can be operated easily and above all reliably.

According to the present invention, this problem is solved by measuring the ACTUAL temperature of the flat material during a welding phase after passing through the gap, comparing the ACTUAL temperature to a predetermined TARGET temperature, and varying the welding amplitude on the basis of the comparison result.

Thus, if the welding speed changes during operation, this will directly affect the temperature of the flat material after it has passed the gap. This temperature deviation is determined according to the present invention, and the welding amplitude is varied accordingly. If, for example, the measured ACTUAL temperature falls below the predetermined TARGET temperature, the welding amplitude is increased according to the invention. If the ACTUAL temperature instead increases above the predetermined TARGET temperature, the welding amplitude is reduced according to the present invention.

In a preferred embodiment, the method according to the invention is realised as part of a continuous control within the welding interval.

The temperature changes described can occur not only by a change in the welding speed. It is also possible that the materials to be welded have thickness variations, which also translates into temperature variations. In addition, the start of the welding operation after a prolonged standstill is in particular affected by a temperature change, because the initially cooled components, such as the sonotrode and the counter-tool, heat up slowly after the start of the welding operation.

By means of the method according to the invention, the rejects necessarily produced at the beginning of the welding operation can be significantly reduced.

In a further preferred embodiment, during the welding phase, the welding speed and/or the welding force is held constant. In particular, when the welding speed is changed by the user and is not merely changed by stresses in the material, it is provided in a preferred embodiment that the welding force is adjusted on the basis of the welding speed. For this purpose, for example, a table can be stored, in which it is possible to look up which welding force is advantageous at which welding speed. This ensures that the welding operation is at least very close to the desired process window. The fine-tuning is then carried out via the control of the welding amplitude according to the invention.

In a further preferred embodiment, it is provided that, prior to the welding phase, during a start-up phase, the welding speed will be increased from zero to a predetermined welding speed value.

In other words, the welding phase, during which the regulation according to the invention takes place, is preceded by a start-up phase in which the welding parameters, i.e., the welding speed, the welding amplitude, and the welding force, among other things, are set to predetermined values.

Preferably, during the start-up phase, the welding amplitude is not varied on the basis of the comparison result.

The start-up phase is therefore given in order to set the welding parameters to a predetermined value that comes as close as possible to the optimal state. In the ideal case, the welding operation is then already carried out in the desired process window. However, even if the welding operation does not take place immediately in the desired process window, the welding operation can be carried out very quickly in the desired process window by the control of the welding amplitude according the invention, because, after the start-up phase, the welding phase begins, in which the fine-optimizing of the welding parameters takes place by varying the welding amplitude on the basis of the measured temperature.

In a further preferred embodiment, it is provided that, after a specified amount of time, the start-up phase ends and the welding phase begins. For example, a typical amount of time required to bring the system into a quasi-continuous vibrating state could be used here as a specified amount of time.

Alternatively, the transition from the start-up phase to the welding phase can also occur as soon as the welding amplitude reaches the predetermined welding amplitude value and/or as soon as the welding force has been increased to the predetermined welding force. It is also possible to then transition from the start-up phase into the welding phase when the ACTUAL temperature has reached or exceeded the TARGET temperature.

In a further preferred embodiment, the start-up phase is still upstream of a standby phase in which the welding speed is zero and the welding amplitude and/or the welding pressure is maintained at a predetermined reduced welding amplitude value or at a predetermined reduced welding pressure value, respectively. In a preferred embodiment, the reduced values are between 40 and 60% of the values sought during the start-up phase.

If the welding operation is interrupted due to a fault or lack of supply of product, the system is not turned off completely but rather set into the standby phase. In order to be ready for use again as quickly as possible, the welding amplitude and/or the welding force are also set to a predetermined reduced value within the standby phase.

Further advantages, characteristics, and possible applications of the present invention will become apparent from the following description of a preferred embodiment and the corresponding figures.

The figures show:

FIG. 1 a schematic view of the welding machine; and

Figure 2:
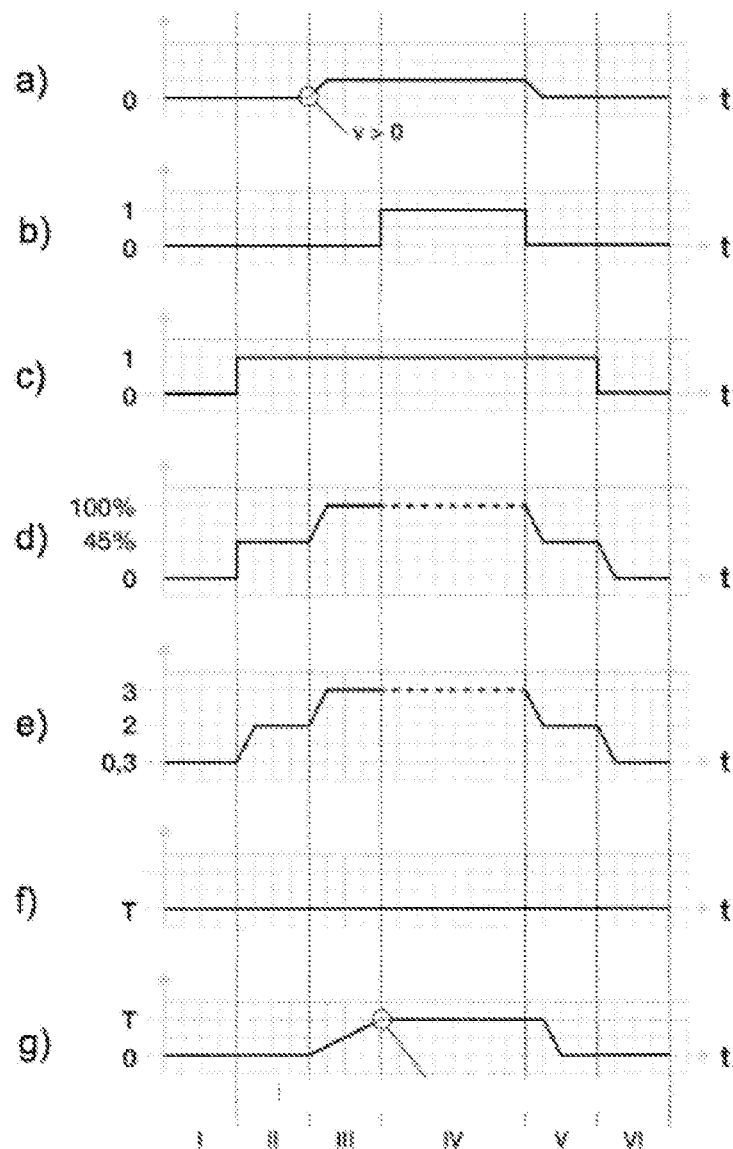

FIG. 2 views of the time-based nature of the individual ultrasonic parameters.

FIG. 1 shows a schematic view of an ultrasonic welding system. It comprises a sonotrode 1 and a counter-tool 2. Between the sonotrode 1 and the counter-tool 2, two material webs 4, 5 are fed through and welded together in the welding system. For this purpose, the sonotrode 1 is vibrated with an ultrasonic vibration with a welding amplitude. In ultrasonic machining, at least the regions of the material webs 4 and 5 facing each other are melted so that the two material webs 4, 5 join together and the sandwich structure 6 is formed.

The machining is usually continuous, i.e. during welding, the material webs 4, 5 and the sandwich structure 6 are respectively moved through the gap in the direction of the arrow at a welding speed. According to the present invention, the temperature of the welded material webs, i.e. the sandwich structure 6, is now measured by means of a temperature sensor 3, preferably immediately after the welding has been carried out.

In order to achieve a particularly reliable welding result, it is necessary to achieve a desired melting temperature in the mutually facing layers of the material webs 4 and 5 during welding. Even if the location of the welding is obscured by the sonotrode 1 or the counter-tool 2, so that a temperature measurement is not possible there, however, the temperature sensor 3 is arranged such that it senses the temperature immediately after the welded foil web 6 comes out of contact with the sonotrode 1. Although the sensed temperature is not the melting temperature, the sensed temperature is still a measure of the welding temperature achieved.

The welding temperature will depend on a variety of factors that can change intentionally or intentionally during the operation. For example, the targeted welding temperature can change due to a change in the welding speed. Material thickness fluctuations of the material webs 4, 5 also change the achieved welding temperature. Finally, the temperature is also influenced by the applied welding force, the welding amplitude, and the surface temperature of the sonotrode 1 and the counter-tool 2.

This means that, at the beginning of the welding operation, the sonotrode 1 and the counter-tool 2 are cooled and therefore a lower welding temperature is achieved than is the case later when the sonotrode 1 and counter-tool 2 are at their working temperature.

According to the invention, the welding amplitude is therefore controlled, namely on the basis of the comparison result of the measured ACTUAL temperature with a predetermined TARGET temperature.

This means that as long as the welding tools involved, namely the sonotrode 1 and the counter-tool 2, have not yet reached their working temperature, the welding operation is performed at a somewhat increased welding amplitude. The speed fluctuations can also be accepted by regulating the welding amplitude without a deterioration of the welding result.

In FIG. 2, for explanation, seven welding parameters, namely a) welding speed, b) control situation, c) state of ultrasonic vibration, d) welding amplitude, e) welding pressure and f) ACTUAL temperature, and g) TARGET temperature are plotted in arbitrary units over one another in a time-based (t) view. In the following consideration, it only depends on the qualitative progression of the parameters, not on their actual value. Because the welding pressure can be calculated from the welding force and the surface to which the welding force is applied, welding pressure and welding force can easily be converted into one another.

The processing is carried out in six phases I-VI.

Phase I is a state in which the welding system is switched off. Welding speed (a), welding amplitude (d), and welding pressure (e) are all zero. There is no ultrasonic vibration and no control. The ACTUAL temperature (g) is at its minimum.

Phase II is a standby phase, in which the welding speed (a) is zero but the ultrasonic vibration (c) is activated and a reduced ultrasonic amplitude (d) as well as a reduced welding pressure (e) are set. In this state, a vibrated state is already present. In addition, there can already be a slight heating of sonotrode and counter-tool.

The standby phase II is followed by the start-up phase III. Within this start-up phase, the welding speed (a) is increased from zero to the predetermined value. The time at which the welding speed is increased from zero is marked in particular in the graph.

At the same time, the welding amplitude (d) is increased to a predetermined value, as is the case for the welding pressure (e). This already leads to a significant temperature increase (see view g). As soon as the ACTUAL temperature reaches the TARGET temperature, a transition is made into the welding phase IV. The transition is marked in particular in the graphic. Only in the welding phase is the welding amplitude (d) and thus also the welding pressure (e) varied, namely on the basis of the difference between the measured ACTUAL temperature (g) and the predetermined TARGET temperature (f). As soon as the welding operation has been completed, a transition is made into phase V, which is again a standby phase. If necessary, phase VI, which is a stop phase and substantially corresponds to phase I, can then follow. However, alternatively, from standby phase V, the start-up phase III can be entered, with the subsequent welding phase IV.

The actual control (b) is only carried out during the welding phase IV. The upstream standby phase reduces the initial vibration time of the system. Only during the start-up phase III, in which no regulation has yet taken place, reject productions can occur. Therefore, phase III must be designed as short as possible.

LIST OF REFERENCE NUMBERS

1 Sonotrode
2 Counter-tool
3 Temperature sensor
4 Material web
5 Material web
6 Sandwich structure/sandwich web

The invention claimed is:

1. A method for operating an ultrasonic welding machine, in which, during a welding process, a flat material is continuously moved through a gap formed between a sonotrode, which is vibrated at an ultrasonic frequency with a welding amplitude, and an anvil at a welding speed while a welding force is exerted onto the flat material by the anvil and/or the sonotrode, wherein during a welding phase, the ACTUAL temperature of the flat material is measured after the flat material has passed through the gap, the ACTUAL temperature is compared with a predetermined TARGET temperature, and the welding amplitude is varied on the basis of the comparison result;

wherein, prior to the welding phase, during a start-up phase, the welding speed is increased from 0 to a predetermined welding speed value, a predetermined welding amplitude and predetermined welding force being sought, characterized in that, during the start-up phase, no variation of the welding amplitude on the basis of the comparison result takes place; and wherein prior to the start-up phase, during a standby phase, the welding amplitude and/or the welding force is held at a predetermined reduced welding amplitude value or at a predetermined reduced welding force value, the reduced welding amplitude and reduced welding force values being between 40 percent and 60 percent of the predetermined values sought during the start-up phase.

2. The method according to claim 1, characterised in that the ACTUAL temperature is continuously controlled during a welding interval by varying the welding amplitude on the basis of the comparison result.

3. The method according to claim 1, characterised in that, during the welding phase, the welding speed and/or the welding force is kept constant.

4. The method according to claim 1, characterised in that, during the start-up phase, the welding amplitude and/or the welding force are increased to a predetermined welding amplitude value and a predetermined welding force value, respectively.

5. The method according to claim 1, characterised in that, after a specified amount of time, the start-up phase ends and the welding phase begins.

6. The method according to claim 4, characterised in that, as soon as the welding amplitude has been increased to the predetermined welding amplitude value or as soon as the welding force has been increased to the predetermined welding force value, the start-up phase is ended and the welding phase is begun.

* * * * *